United States Patent
Shibuya et al.

(10) Patent No.: US 12,291,454 B2
(45) Date of Patent: May 6, 2025

(54) PRODUCTION METHOD OF CARBON NANOTUBE ASSEMBLY

(71) Applicant: ZEON CORPORATION, Tokyo (JP)

(72) Inventors: Akiyoshi Shibuya, Tokyo (JP); Keiichi Kawata, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 147 days.

(21) Appl. No.: 17/760,361

(22) PCT Filed: Feb. 15, 2021

(86) PCT No.: PCT/JP2021/005570
§ 371 (c)(1),
(2) Date: Aug. 9, 2022

(87) PCT Pub. No.: WO2021/172077
PCT Pub. Date: Sep. 2, 2021

(65) Prior Publication Data
US 2023/0083267 A1    Mar. 16, 2023

(30) Foreign Application Priority Data
Feb. 28, 2020    (JP) .................................. 2020-034301

(51) Int. Cl.
*C01B 32/164* (2017.01)
*C01B 32/162* (2017.01)

(52) U.S. Cl.
CPC .......... *C01B 32/164* (2017.08); *C01B 32/162* (2017.08); *C01B 2202/08* (2013.01); *C01B 2202/32* (2013.01)

(58) Field of Classification Search
None
See application file for complete search history.

(56) References Cited

U.S. PATENT DOCUMENTS

| 7,897,209 B2 | 3/2011 | Shibuya et al. |
| 7,947,245 B2 * | 5/2011 | Tada ........................ C01B 32/15 422/150 |

(Continued)

FOREIGN PATENT DOCUMENTS

| CN | 102741161 A | 10/2012 |
| CN | 107311146 A | 11/2017 |

(Continued)

OTHER PUBLICATIONS

May 11, 2021, International Search Report issued in the International Patent Application No. PCT/JP2021/005570.

(Continued)

*Primary Examiner* — Alexander M Weddle
(74) *Attorney, Agent, or Firm* — KENJA IP LAW PC (57) ABSTRACT

A production method for growing a carbon nanotube assembly on a substrate having a catalyst on a surface thereof. In this production method, in each of a formation unit that carries out a formation step of reducing a catalyst on the substrate and a growth unit that carries out a growth step of growing a carbon nanotube assembly, the substrate is continuously being conveyed using conveyance units that convey the substrate by screw rotations. In carrying out the formation step and the growth step, these steps are carried out while the gas environments in these steps are prevented from mixing with each other.

8 Claims, 4 Drawing Sheets

(56) References Cited

U.S. PATENT DOCUMENTS

| | | | |
|---|---|---|---|
| 2006/0228286 A1 | | 10/2006 | Tada et al. |
| 2010/0196600 A1* | | 8/2010 | Shibuya .............. C23C 16/0281 |
| | | | 118/724 |
| 2011/0116995 A1 | | 5/2011 | Shibuya et al. |
| 2016/0221828 A1* | | 8/2016 | Shibuya ................. C01B 32/15 |

FOREIGN PATENT DOCUMENTS

| | | | |
|---|---|---|---|
| JP | 2006290682 A | 10/2006 | |
| JP | 2011068501 A | 4/2011 | |
| JP | 2011219316 A | 11/2011 | |
| JP | 2011241104 A | 12/2011 | |
| JP | 2012126599 A | 7/2012 | |
| JP | 2012250862 A | 12/2012 | |
| JP | 5285730 B2 | 9/2013 | |
| JP | 5471959 B2 | 4/2014 | |
| JP | 2016088787 A | 5/2016 | |
| JP | 2019167266 A | 10/2019 | |
| KR | 1020060097940 A | 9/2006 | |
| WO | 2009128349 A1 | 10/2009 | |

OTHER PUBLICATIONS

Aug. 30, 2022, International Preliminary Report on Patentability issued in the International Patent Application No. PCT/JP2021/005570.

Feb. 7, 2025, the Extended European Search Report issued by the European Patent Office in the corresponding European Patent Application No. 21760679.7.

* cited by examiner

PRODUCTION METHOD OF CARBON NANOTUBE ASSEMBLY

TECHNICAL FIELD

The present disclosure relates to a method of producing a carbon nanotube assembly, and more particularly, to a method of producing a high-quality carbon nanotube assembly having a specific surface area of 600 $m^2/g$ or more.

BACKGROUND

In recent years, nanocarbon materials such as carbon nanotubes (hereinafter, also referred to as "CNTs") have been attracting attentions as materials having excellent electrical conductivity, thermal conductivity, and mechanical properties. Although it has been well-known that nanocarbon materials can provide superior properties, they are generally more expensive than other materials because of their higher manufacturing costs.

So far, various attempts have been made for the purpose of achieving efficient production of nanocarbon materials. For example, PTL 1 teaches a production method for producing CNTs, wherein the method carries out a formation step of bringing a catalyst into a reduced state under a reducing gas atmosphere and a growth step of growing CNTs on the catalyst under a source gas atmosphere while preventing these atmospheres from mixing with each other. In view of increasing the production efficiency, substrates in a form with a large per-volume-surface area such as a powdery form are advantageous. However, when powdery substrates are conveyed by means of the belt conveyor technique, there is a problem in that agitation of the substrate is insufficient, which causes remarkable ununiformity of growth of CNTs between substrates. Furthermore, as an example, PTL 2 teaches a production method of nanocarbon. The method includes conveying a catalyst bodies through a reaction tube including a catalyst activation zone, a nanocarbon synthesis zone, and a cooling zone, using a conveyance means such as a belt conveyor under agitation. However, because atmospheric gases of the zones cannot be not spatially separated from each other, the reducing gas and the source gas are switched time-wise or mixing of the gases is tolerated. Thus, substantially continuous production of high-quality nanocarbon such as single-walled carbon nanotubes is not achieved. Even furthermore, as an example, PTL 3 teaches a method of producing nanocarbon. The method includes continuously supplying a hydrocarbon and a catalyst by a screw feeder so that they come into contact with each other in an opposite current state or a forward current state. Methane is used as the hydrocarbon of the source gas in this teaching. In this case, the catalyst reduction step is not necessarily required and division of the inside of the reaction tube into zones is not required. However, primary synthesized products are multilayer carbon nanotubes, and the growth rate is slow. Thus, high-quality nanocarbon such as single-walled carbon nanotubes cannot be produced continuously with a high production efficiency.

CITATION LIST

Patent Literature

PTL 1: JP 5471959 B
PTL 2: JP 2011-241104 A
PTL 3: JP 5285730 B

SUMMARY

Technical Problem

In view of further improvements in the quality and the production efficiency of nanocarbon materials produced, there is room for improvement in the production methods of nanocarbon materials according to the above-mentioned prior art.

It would be therefore helpful to provide a method of producing a carbon nanotube assembly which enables efficient production of a high-quality carbon nanotube assemblies.

Solution to Problem

The present inventors have conducted diligent investigation for solving the aforementioned problem. The present inventors then have attained novel finding that a high-quality CNT assemblies can be produced efficiently by separately carrying out a formation step and a growth step in this order and by conveying a substrate having a catalyst on the surface thereof by screw rotations in these steps in production of the CNT assembly, thereby completing the present disclosure.

That is, the present disclosure is directed to advantageously solving the above-mentioned problem, and a method of producing a CNT assembly of the present disclosure is a method of producing a carbon nanotube assembly for growing a carbon nanotube assembly having a specific surface area of 600 $m^2/g$ or more on a substrate having a catalyst on a surface thereof, the method comprising: carrying out, by using an apparatus comprising a formation unit that implements a formation step of causing an environment around the catalyst to become a reducing gas environment, and heating at least one of the catalyst and the reducing gas; a growth unit that implements a growth step of growing the carbon nanotube assembly by causing the environment around the catalyst to become a source gas environment, and heating at least one of the catalyst and the source gas;

a connection section that spatially connects a furnace internal space of the formation unit and a furnace internal space of the growth unit to each other; a first conveyance unit and a second conveyance unit, wherein the first conveyance unit conveys the substrate by screw rotations in the furnace internal space of the formation unit, the second conveyance unit conveys the substrate by screw rotations in the furnace internal space of the growth unit, the first conveyance unit and the second conveyance unit are configured as a single common unit and/or separate units; and a gas mixing prevention device which prevents the gas of the furnace internal space of the formation unit and the gas of the furnace internal space of the growth unit from mixing with each other, the formation step and the growth step while continuously conveying the substrate and preventing the gas environments in the respective steps from mixing with each other. According to such a production method, high-quality CNT assemblies can be efficiently produced.

In the method of producing a CNT assembly of the present disclosure, preferably, the formation unit and the growth unit are separate components and are connected in series by the connection section. According to such a production method, the conditions of the formation step and the growth step can be easily optimized independently, and the quality of CNT assemblies obtained and the production efficiency of the CNT assemblies can be further improved.

Even further, in the method of producing a CNT assembly of the present disclosure, preferably, the gas mixing prevention device prevents the gas of the furnace internal space of the formation unit and the gas of the furnace internal space of the growth unit from mixing with each other by controlling a current. According to such a production method, reduction of the catalyst in the formation step becomes less likely to be inhibited, and the quality of CNT assemblies obtained and the production efficiency of the CNT assemblies can be further improved.

Further, in the method of producing a CNT assembly of the present disclosure, preferably, at least one of the following is achieved: in the formation step, the reducing gas is continuously fed so that the substrate being conveyed by the first conveyance unit and the reducing gas are brought into contact with each other in a state of an opposite current and a forward current in the furnace internal space of the formation unit; and in the growth step, the source gas is continuously fed so that the substrate being conveyed by the second conveyance unit and the source gas are brought into contact with each other in a state of an opposite current and a forward current in the furnace internal space of the growth unit. According to such a production method, the quality of CNT assemblies obtained and the production efficiency of the CNT assemblies can be further improved.

Further, in the method of producing a CNT assembly of the present disclosure, preferably, the source gas environment in the growth step is an environment having a high carbon concentration and comprises a catalyst activating material. Growth of CNTs while the catalytic activity is maintained for long time can be achieved in the growth step by growing the CNTs in a high concentration carbon environment containing the catalyst activating material. This contributes to further improvement in the quality of CNT assemblies obtained and the production efficiency of the CNT assemblies.

Further, in the method of producing a CNT assembly of the present disclosure, preferably, the source gas environment comprises ethylene and carbon dioxide as the catalyst activating material. By carrying out the growth step under such an environment, the quality of the CNT assemblies obtained and the production efficiency of the CNT assemblies can be further improved.

In the method of producing a CNT assembly of the present disclosure, preferably, the substrate is particles having an apparent density of 2.0 $g/cm^3$ or more. When the substrate is particles having an apparent density of 2.0 $g/cm^3$ or more, the resulting CNTs aggregate can be lengthened.

When a support is a particle having voids (closed pores) inside thereof, the "apparent density" of the support refers to the mass per unit volume including the voids. The "apparent density of the support" can be measured according to the pycnometer method.

Further, in the method of producing a CNT assembly of the present disclosure, preferably, the substrate comprises one or more elements of Al, Si, and Zr. By using a substrate containing one or more elements of Al, Si, and Zr, the production efficiency of CNT assemblies can be further improved.

Further, the method of producing a CNT assembly of the present disclosure preferably comprises a catalyst layer forming step of forming a catalyst layer on the substrate; a separation and recovery step of separating the carbon nanotube assembly from the substrate and recovering the substrate and the carbon nanotube assembly separately; and a recycling step of removing by oxidizing carbon on the recovered substrate to make the substrate reusable. By carrying out the separation and recovery step and the recycling step, the production efficiency of CNT assemblies can be further improved.

Advantageous Effect

According to the present disclosure, a method of producing a carbon nanotube assembly which can efficiently produce high-quality CNT assemblies can be provided.

DETAILED DESCRIPTION

The following provides a description of embodiments of the present disclosure with reference to the drawings. According to a method of producing CNT assembly according to the present disclosure, carbon nanotube assemblies having a specific surface area of 600 $m^2/g$ or more can be efficiently produced. In the following description, based on the progress of the process from a formation step to a growth step, an arbitrary cooling step, and a separation step, operations or components of the manufacturing apparatus for carrying out the operations on earlier stage are referred to as operations or components of on the "front stage side", and operations or components on later stage are referred to as operations or components of on the "rear stage side".

The method of producing a CNT assembly is a method for growing a CNT assembly having a specific surface area of 600 $m^2/g$ or more on a substrate having a catalyst on a surface thereof. The method of producing a CNT assembly of the present disclosure is a method including carrying out, by using a CNT manufacturing apparatus having the following components, a formation step and a growth step while continuously conveying the substrate and preventing respective gas environments in the following steps from mixing with each other:

a formation unit that implements a formation step of causing an environment around the catalyst to become a reducing gas environment and heating at least one of the catalyst and the reducing gas;

a growth unit that implements a growth step of growing the carbon nanotube assembly by causing the environment around the catalyst to become a source gas environment, and heating at least one of the catalyst and the source gas;

a connection section that spatially connects a furnace internal space of the formation unit and a furnace internal space of the growth unit to each other;

a first conveyance unit and a second conveyance unit, wherein the first conveyance unit conveys the substrate by screw rotations in the furnace internal space of the formation unit, the second conveyance unit conveys the substrate by screw rotations in the furnace internal space of the growth unit, the first conveyance unit and the second conveyance unit can be implemented as a single common unit and/or separate units; and a gas mixing prevention device which prevents the gas of the furnace internal space of the formation unit and the gas of the furnace internal space of the growth unit from mixing with each other.

<Substrate Having Catalyst on Surface Thereof>

A substrate composing the substrate which is used in the production method of the present disclosure and has a catalyst on the surface thereof can be formed by causing the catalyst to be supported on the substrate.

<<Substrate>>

The substrate is a member capable of supporting a catalyst for synthesizing CNTs on the surface thereof, and is not particularly limited and a member made of any material can be used. Particularly, the substrate is preferably made of a ceramic material containing one or more elements of Al, Si, and Zr. The substrate is further preferably made of a metal oxide containing at least one element of Al, Si, and Zr, and more preferably zirconium dioxide ($ZrO_2$). The substrate is preferable in the form of particles having an aspect ratio of less than 5. The "aspect ratio" of the substrate particles can be obtained by calculating the value of (the major axis/the width orthogonal to the major axis) of each of a plurality of arbitrarily selected particles in a microscopic image, and determining the average of the calculated values. Further, the substrate particles preferably have an apparent density of 2.0 $g/cm^3$ or more, preferably 3.8 $g/cm^3$ or more, and more preferably 5.8 $g/cm^3$ or more, and preferably 8.0 $g/cm^3$ or less. When the apparent density of the particulate substrate is equal to or more than any of the above lower limits, the CNT assembly produced can be elongated. When the apparent density of the particulate substrate is equal to or less than above upper limit, an excellent handleability is given to the substrate particles and the production efficiency of CNT assemblies can be further increased. Further, the particle diameter of the substrate particles is preferably 0.05 mm or more, more preferably 0.3 mm or more, and is preferably 10 mm or less, more preferably 2 mm or less, and even more preferably 1 mm or less. When the particle diameter of the substrate particles is equal to or larger than any of the above lower limits, CNT assemblies obtained can be elongated. When the particle diameter of the substrate particles is equal to or smaller than any of the above upper limits, the production efficiency of CNT assemblies can be further increased. Note that the "particle diameter" of the substrate particle means the volume average particle diameter D50. The "volume average particle diameter D50" refers to a particle diameter at which, in a particle size distribution (volume basis) measured on the substrate particles by laser diffraction, the cumulative volume calculated from the smaller diameter side of the distribution reaches 50%.

Catalyst

The catalyst supported on the substrate is not particularly limited, and examples thereof include catalyst components such as nickel (Ni), iron (Fe), cobalt (Co), and molybdenum (Mo). Of these, the catalyst component preferably contains at least one metal of nickel (Ni), iron (Fe), cobalt (Co), and molybdenum (Mo) from the viewpoint of further increasing the production efficiency of the CNT assemblies.

Further, a base layer made of a material such as aluminum oxide, titanium oxide, titanium nitride, or silicon oxide, for example, can be optionally provided as a base layer for causing the catalyst to be supported on the substrate.

Method for Preparing Substrate Having Catalyst on Surface Thereof

There is no particular limitation on the technique for causing the catalyst (or catalyst layer) to be supported on the surface of the substrate (catalyst layer forming step), and any conventional technique can be employed. Of these, in the case where substrate particles are used as the substrate, a technique in which a rotary drum type coating apparatus having a substantially cylindrical rotary drum is preferably used. This technique includes a spraying step of charging the substrate into the substantially cylindrical rotary drum, agitating the substrate particles by rotating the rotary drum around a tilted axis as the rotation axis and spraying a catalyst solution containing the above-mentioned catalyst component onto the substrate particles being agitated, and a drying step of allowing a drying gas to flow into the rotary drum so that the drying gas comes in contact with the substrate particles onto which the catalyst solution has been sprayed, wherein at least a part of the time duration of the agitating step and at least a part of the time duration of the spraying step overlap. In the case where a base layer is disposed on the surface of the substrate before making the catalyst to be supported, a spraying step and a drying step similar to the spraying step and the drying step described above are carried out using a solution containing a component which can form the base layer and the substrate particles before spraying and drying of the catalyst solution, whereby substrate particles having the base layer on the surfaces thereof can be obtained. The substrate particles having the base layer formed on the surfaces thereof are then subjected to the spraying step and the drying step described above, to thereby obtain substrate particles onto which the base layer and the catalyst (or the catalyst layer) are supported on the surfaces thereof in this order.

In the case where substrate particles are used as the substrate, other than the above technique, examples of the technique of preparing a substrate having the catalyst (or the catalyst layer) formed on the surface thereof include a technique including a step of spraying a catalyst solution while allowing the substrate particles to float and flow in a centrifugal swirling flow in the vertical direction.

Reducing Gas

The reducing gas is a gas having at least one of the effects of: catalyst reduction, promotion of micronization of the catalyst, and improvement in the catalytic activity. The reducing gas may, for example, be hydrogen gas, ammonia, water vapor, or a gas that is a mixture of these. Furthermore, the reducing gas may be a mixed gas obtained by mixing hydrogen gas with an inert gas such as helium gas, argon gas, and nitrogen gas. The reducing gas is generally used in the formation step but may be used in the growth step as appropriate.

Source Gas

Examples of the source gas used for synthesis of the CNT assemblies include hydrocarbons such as methane, ethane, ethylene, propane, butane, pentane, hexane, heptane, propylene, and acetylene; lower alcohols such as methanol and ethanol; and oxygen-containing compounds having low carbon numbers such as acetone and carbon monoxide. Mixtures of some of these may also be used. Furthermore, the source gas may be diluted with an inert gas as the ones described above.

Herein, the source gas preferably contains ethylene. Heating ethylene within a certain temperature range (700° C. or higher and 900° C. or lower) can promote a decomposition reaction of ethylene, which leads to fast growth of CNTs when the decomposed gas is brought into contact with the catalyst. However, if the thermal decomposition time is too long, the decomposition reaction of ethylene proceeds excessively, causing deactivation of the catalyst and adhesion of carbon impurities onto the CNT assembly. In production of the CNT assemblies of the present disclosure, in an ethylene concentration range of an of 0.1 volume % or more and 40 volume % or less, the thermal decomposition time ranges preferably 0.5 seconds or longer and 10 seconds or shorter. If the thermal decomposition time is shorter than 0.5 seconds, thermal decomposition of ethylene is insufficient, which makes fast growth of CNT assemblies having a large specific surface area difficult. If the thermal decomposition time is longer than 10 seconds, ethylene is decomposed excessively and carbon impurities are generated in a large amount, which causes deactivation of the catalyst and lowered quality of the CNT assemblies. The thermal decomposition time is calculated from the following equation:

(Thermal decomposition time)=(volume of heating channel)/{(flow rate of source gas)×(273.15+$T$)/273.15} where the volume of the heating channel is the volume of a flow path heated to a predetermined temperature $T$ ° C., through which the source gas is made to flow before the source gas is brought into contact with the catalyst, and the flow rate of the source gas is a flow rate at 0° C. under 1 atm.

Catalyst Activating Material

A catalyst activating material may be added during the growth step of CNTs. Addition of the catalyst activating material can further improve the production efficiency and the quality of the CNT assemblies. Herein, the catalyst activating material used is generally an oxygen-containing material, and may be any material that does not significantly damage CNTs at the growth temperature. Examples thereof include, in addition to water, hydrogen sulfide; oxygen, ozone, nitric oxide, and oxygen-containing compounds having low carbon numbers such as carbon monoxide and carbon dioxide; alcohols such as ethanol and methanol; ethers such as tetrahydrofuran; ketones such as acetone; aldehydes; esters; nitric oxide; and mixtures thereof, for example. Of these, water, oxygen, carbon dioxide, carbon monoxide, or tetrahydrofuran is preferred, and carbon dioxide is more preferred. Growth of CNTs in an high carbon concentration environment including the catalyst activating material in the growth step enables growth of CNTs while preserving the catalytic activity for long time. This contributes to further improvement in the quality of CNT assemblies obtained and the production efficiency of the CNT assemblies. Further, in the case where the source gas contains ethylene, presence of carbon dioxide as a catalyst activating material can further improve the quality of CNT assemblies obtained and the production efficiency of the CNT assemblies. The reason is hypothesized as follows.

First, it has been found that, in CNT synthesis reaction, the activity of ethylene as a carbon source is relatively low and the activity of carbon dioxide as a catalyst activating material is low. Therefore, when a gas mixture containing these gases passes through a layer composed of a substrate having a catalyst on the surface thereof, that is, a layer made of a collection of substrates continuously conveyed by screw rotations, the concentrations of these gases consumed in the CNT synthesis reaction decrease very slowly, which contributes to relatively uniform distributions of the concentrations of the gases in the layer. As a result, growth of CNTs becomes uniform between the substrates, and the production efficiency can be increased.

In the case of carbon dioxide as the catalyst activating material added, for example, the amount of the catalyst activating material in the growth step may be 0.5 volume % or more of the atmosphere in the growth step, and is preferably 4 volume % or more, more preferably 5 volume % or more, and is typically 40 volume % or less.

High Carbon Concentration Environment

A high carbon concentration environment refers to an atmosphere in which the source gas accounts for 0.1 volume % or more of the atmosphere in the growth step (hereinafter, sometimes referred to as "source gas environment"). Note that the percentage of the source gas in the high carbon concentration environment may be, for example, 40 volume % or less. Further, the percentage of the source gas in the high carbon concentration environment is preferably 4 volume % or more, more preferably 5 volume % or more, even more preferably 10 volume % or more, and is preferably 30 volume % or less. Here, presence of the catalyst activating material in the source gas environment remarkably improves the catalytic activity. Hence, the catalyst does not lose the activity thereof even in the high carbon concentration environment, which enables CNT assemblies to be grown over a long period of time, and remarkably improves the growth rate thereof.

Reaction Temperature

The reaction temperature at which CNT assemblies are grown is not particularly limited, and may be, for example, 400° C. or higher and 1100° C. or lower. Further, in the case where the source gas contains ethylene, the reaction temperature is preferably 700° C. or higher and 900° C. or lower.

Formation Step

The formation step is a step of causing an environment around the catalyst supported on the substrate to become a reducing gas environment and heating at least one of the catalyst and the reducing gas. This step leads to one or more effects of: catalyst reduction, promotion of micronization of the catalyst to a state suitable for CNT growth, and improvement in the catalytic activity.

In the formation step, it is preferable that the reducing gas is continuously fed so that the substrate being conveyed by the first conveyance unit and the reducing gas are brought into contact with each other in a state of an opposite current and a forward current in the furnace internal space of the formation unit. According to such a production method, quality of CNT assemblies obtained and the production efficiency of the CNT assemblies can be further improved. More specifically, the substrate that is being conveyed by the first conveyance unit and the reducing gas are brought into contact with each other in the state of the opposite current and the forward current. As a result, because the substrate and the reducing gas can be brought into contact with each other over the period of time during which the substrate is being conveyed in the formation unit, the time of contact between the substrate and the reducing gas can be efficiently ensured. In addition, by configuring so as to provide both the opposite current and the forward current as the directions of contact between these, rather than selecting either of them, the efficiency of their contact can be improved. Furthermore, by appropriately setting the respective positions for introducing and venting the reducing gas in this configuration, it is possible to optimize the residing time of the reducing gas in the manufacturing apparatus. This also contributes to further improvement in the quality of CNT assemblies obtained and the production efficiency of the CNT assemblies.

The temperature of the catalyst carrier or the reducing gas atmosphere in the formation step is preferably 400° C. or higher and 1100° C. or lower. The time to carry out the formation step may be 3 minutes or longer and 120 minutes or shorter.

Growth Step

The growth step is a step of growing CNT assemblies by causing the environment around the catalyst which has become a suitable state for producing the CNT assemblies in the above-described formation step, to become a source gas environment, and heating at least one of the catalyst and the source gas. The production method of the present disclosure carries out the two steps while continuously conveying the substrate by screw rotations, so that the gas environments in the formation step and the growth step are prevented from mixing with each other. This contributes to further improvement in the quality of CNT assemblies obtained and the production efficiency of the CNT assemblies.

Also in the growth step, similar to the above-described formation step, it is preferable that the source gas is continuously fed so that the substrate and the source gas that is being conveyed by the second conveyance unit are brought into contact with each other in the state of the opposite current and the forward current in the furnace internal space of the growth unit. This contributes to further improvement in the quality of CNT assemblies obtained and the production efficiency of the CNT assemblies. Further, by appropriately setting the respective positions for introducing and venting the source gas, it is possible to optimize the residing time of the source gas in the manufacturing apparatus. This also contributes to further improvement in the quality of CNT assemblies obtained and the production efficiency of the CNT assemblies.

Cooling Step

Optionally, a cooling step can be performed after the growth step. In the cooling step, the CNT assemblies obtained in the growth step, the catalyst, and the substrate are cooled in the presence of an inert gas. The CNT assemblies, the catalyst, and the substrate are at a high temperature after the growth step, and therefore tend to be oxidized upon being placed in an environment the presence of oxygen. Accordingly, the aligned CNT assemblies, the catalyst, and the substrate are preferably cooled to 400° C. or lower, and preferably 200° C. or lower under an inert gas environment.

Separation and Recovery Step

In the separation and recovery step, the carbon nanotube assembly is separated from the substrate, and the substrate and the carbon nanotube assembly are recovered separately. Any well-known techniques may be used as the recovery method without any specific limitations. Of these, it is preferable to employ a separation and recovery method utilizing an external force and a flow of a fluid as the drag force of the external force (e.g., an air vortex formed by a centrifugal force and an air flow as the drag force of the centrifugal force) (see WO 2019/188979 A, for example).

Recycling Step

In the recycling step, carbon on the recovered substrate is oxidized and removed so that the substrate can be reused. The oxidation and removal method is not particularly limited, and examples thereof include a method of heating a substrate under stream of the air. By carrying out this recycling step, the cost associated with the substrate can be reduced.

Properties of CNT Assembly

The specific surface area of the CNT assemblies obtained by the production method of the present disclosure is a value determined for CNTs that have not undergone opening formation treatment based on the Brunauer, Emmett, and Teller method from an adsorption and desorption isotherm at 77 K of liquid nitrogen. The specific surface area of CNT assemblies can be measured using, for example, a BET specific surface area measurement apparatus according to JIS Z 8830. The specific surface area of the CNTs obtained by the present disclosure is preferably 600 $m^2/g$ or more, more preferably 800 $m^2/g$ or more, and is preferably 2600 $m^2/g$ or less, more preferably 1400 $m^2/g$ or less. Further, the specific surface area of the CNT assemblies which have been undergone the opening treatment is preferably 1300 $m^2/g$ or more.

CNT Manufacturing Apparatus

Figure 1:
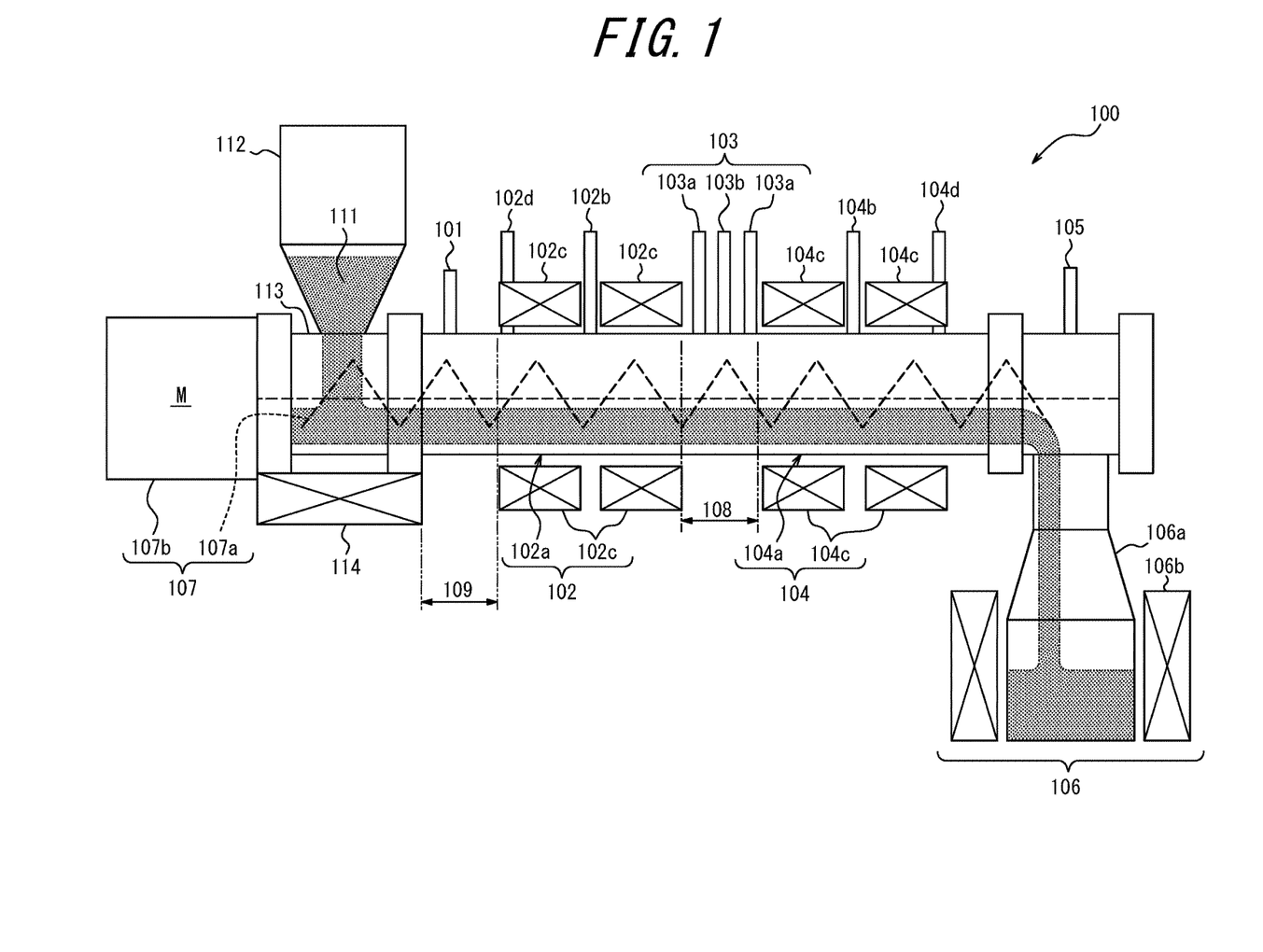
FIG. 1 is a diagram for explaining a schematic configuration of an apparatus capable of carrying out a CNT assembly production method according to one example of the present disclosure.

FIG. 1 is a diagram for explaining a schematic configuration of an apparatus capable of carrying out the CNT assembly production method according to one example of the present disclosure. According to the CNT assembly manufacturing apparatus 100 illustrated in FIG. 1, the method of manufacturing a CNT assembly of the present disclosure can be implemented. This CNT assembly manufacturing apparatus 100 includes a formation unit 102, a growth unit 104, a conveyance unit 107 that conveys a substrate while the substrate passes from the formation unit 102 to the growth unit 104, a connection portion 108 that spatially connects the formation unit 102 and the growth unit 104 to each other, and a gas mixing prevention device that prevents the gas of the formation unit 102 and the gas of the growth unit 104 from mixing with each other. Further, the CNT assembly manufacturing apparatus 100 includes components such as an inlet purge device 101 disposed at the front stage of the formation unit 102, an outlet purge device 105 disposed at the rear stage of the growth unit 104, and a cooling unit 106 disposed at the rear stage of the outlet purge device 105.

Inlet Purge Device

The inlet purge device 101 is composed of set of devices for preventing external air from entering into the furnace of the apparatus from the substrate inlet. The inlet purge device 101 has the function of replacing the environment around the substrate conveyed into the CNT assembly manufacturing apparatus 100 with a purge gas. Examples thereof include a furnace or a chamber for retaining the purge gas and an ejection device for injecting the purge gas, for example. The purge gas is preferably an inert gas, and nitrogen is particularly preferred in terms of safety, cost, purging properties, and the like. Hydrogen may be contained in a small amount for the purpose of improving the catalytic activity. In the case where the substrate inlet is constantly open, it is preferable that the purge gas ejection device is formed as a gas curtain device composed of gas feeding devices configured to inject the purge gas in the form of shower from above and below, so that the external air is prevented from entering from the inlet of the CNT assembly manufacturing apparatus 100 and being mixed. In the aspect illustrated in FIG. 1, the inlet purge device 101 is attached to a connection section 109 that connects a front chamber 113 which is a component for introducing the substrate into the system via a hopper 112 and a formation furnace 102a.

Formation Unit

The formation unit 102 is composed of a set of devices for implementing the formation step. The formation unit 102 has the function of causing the environment around the catalyst formed on the surface of the substrate 20 to become a reducing gas environment and heating at least one of the catalyst and the reducing gas. The formation unit 102 may include, for example, a formation furnace 102a for retaining the reducing gas, a reducing gas ejection device 102b for injecting the reducing gas, a heating device 102c for heating at least one of the catalyst and the reducing gas, an vent device 102d for venting the gases inside the furnace out of the system, and the like. The heating device 102c is not particularly limited, and may be implemented by, for example, a resistance heater, an infrared heater, an electromagnetic induction heater, or the like. In addition, the heating device 102c may heat the inside of the system so that the temperature in the formation furnace becomes 400° C. or higher and 1100° C. or lower. Furthermore, the vent device 102d is a component for exhausting the reducing gas inside the furnace, and includes a reducing gas exhaust vent disposed on a side surface of the furnace body of the formation furnace 102a. The formation unit 102 preferably includes at least one reducing gas exhaust vent, and may include a plurality of reducing gas exhaust vents.

Growth Unit

The growth unit 104 is a set of devices for implementing the growth step. The growth unit 104 has the function of causing the environment around the catalyst which has become the state suitable for producing CNT assemblies in the formation step to become a source gas environment, and growing CNT assemblies by heating at least one of the catalyst and the source gas. Specifically, the growth unit 104 may be configured from a growth furnace 104a for maintaining the source gas environment, a source gas ejection device 104b for injecting the source gas, a heating device 104c for heating at least one of the catalyst and the source gas, an vent device 104d for venting the gases inside the furnace out of the system, and the like. The heating device 104c is not particularly limited, and may be implemented by, for example, a resistance heater, an infrared heater, an electromagnetic induction heater, or the like. Further, although not illustrated, the growth unit 104 preferably includes a device for adding the catalyst activating material. The vent device 104d is a component for exhausting the source gas inside the furnace out of the system, and includes a source gas exhaust vent disposed on a side surface of the furnace body of the growth furnace 104a. The growth unit 104 preferably includes at least one source gas exhaust vent, and may include a plurality of source gas exhaust vents.

Figure 2:
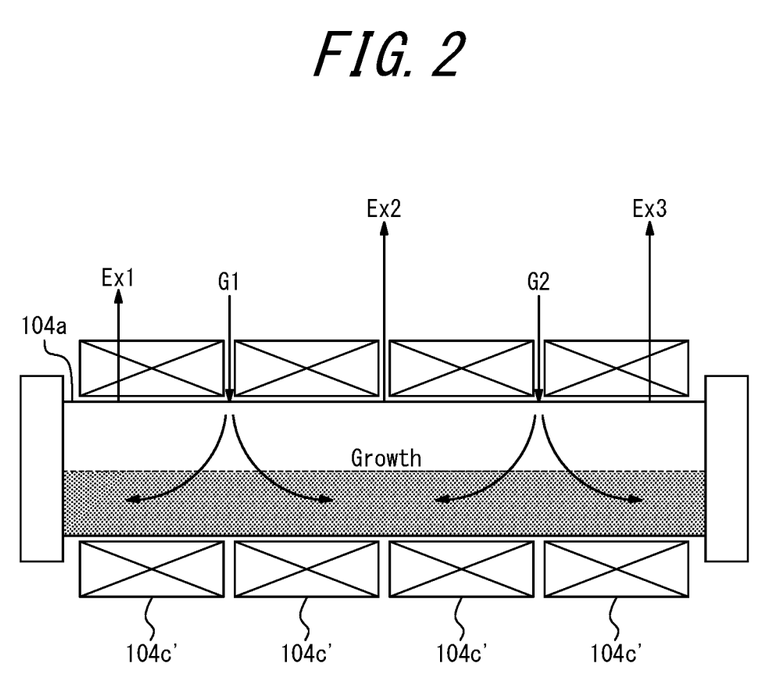
FIG. 2 is a schematic diagram for explaining flows of a source gas in a growth unit provided in the apparatus capable of carrying out the CNT assembly production method according to one example of the present disclosure.

Now, the flows of the source gas in the growth unit will now be described with reference to FIG. 2. For the sake of clarity, the conveyance unit is omitted from illustration in FIG. 2. The components that have similar functions to those of the corresponding components illustrated in FIG. 1 are given the same reference symbols as the reference symbols used in FIG. 1. Components which fundamentally have similar functions to those of the corresponding components illustrated in FIG. 1, but are slightly different in terms of the layout or the like are denoted by the same reference symbols as those used in FIG. 1 appended with "'". The growth furnace 104a illustrated in FIG. 2 includes a plurality of heating devices 104c'; two source gas inlets G1 and G2 on a side surface of the furnace body; and three source gas outlets Ex1 to Ex3, one at the interval between the two source gas inlets G1 and G2, one on the front stage side, and one on the rear stage side in the substrate conveying direction. Suction forces generated by exhausts from the source gas exhaust vents Ex1 to Ex3 cause the gas from the two source gas inlets G1 and G2 to flow in the forward direction and the reverse direction with respect to the substrate conveying direction. As a result, the substrate being conveyed along the conveying direction and the source gas are brought into contact with each other in a state of an opposite current and a forward current. By adjusting the introduction rate and the introduction balance of the source gas from the source gas inlets G1 and G2, and the exhaust rate and the exhaust balance from the source gas exhaust vents Ex1 to Ex3, the residence time of the source gas in the system can be easily optimized. This leads to further improvements in the quality of CNT assemblies obtained and the production efficiency of the CNT assemblies. Further, formation of flows of the gases as described above enables prevention of mixing of respective gases inside the furnace internal spaces of adjacent units achieved by controls on currents by the gas mixing prevention device 103.

The growth unit has been used as a specific example in the above description. Similar controls on behaviors of the reducing gas in the formation unit can be easily achieved by applying a similar configuration to the formation unit.

Catalyst Activating Material Addition Device

A catalyst activating material addition device is composed of a set of devices for adding a catalyst activating material into the source gas or for directly adding the catalyst activating material to the environment around the catalyst in the internal space of the growth furnace. The catalyst activating material addition device for feeding the catalyst activating material is not particularly limited, and may include, for example, a feed system capable of achieving feeding by a bubbler, feeding by vaporizing a solution containing the catalyst activating material, feed as a gas as it is, and feeding by liquefying and vaporizing a solid catalyst activating material. The feed system may include, for example, a vaporizer, mixer, stirrer, diluter, spray, pump, compressor, and the like. A measurement device to measure the concentration of the catalyst activating material may be provided in the supply tube for the catalyst activating material or the like. An output value from this measurement device is used for a feedback control for stable feeding of the catalyst activating material with little change over time.

Conveyance Unit

The conveyance unit 107 is a unit for continuously conveying the substrate 111 by screw rotations. For example, the conveyance unit 107 may be implemented by a screw conveyor. The screw conveyor may be implemented by a screw vane 107a and a driving device 107b such as a motor which can rotate the screw vane to provide the function to convey the substrate. As illustrated in FIG. 1, the substrate can be introduced into the apparatus from outside the system through the hopper 112, for example. The vicinity of the driving device 107b may be heated by a heating device 114 configured to be capable of heating the inside of the system at a temperature lower than the heating temperature in the formation unit. The diameter, the winding pitch, and the like of the screw vane constituting the screw conveyor can be arbitrarily adjusted based on the size and the like of the substrate used.

Here, FIG. 1 illustrates the configuration in which a first conveyance unit that conveys the substrate by screw rotations in the furnace internal space of the formation unit 102 and a second conveyance unit that conveys the substrate by screw rotations in the furnace internal space of the growth unit 104 are implemented by a screw vane 107a and a driving device 107b, which are a single common unit. As will be described later with reference to FIG. 3, the first conveyance unit and the second conveyance unit can also be implemented as separate units. Alternatively, two separate conveyance units may be provided, wherein one conveyance unit is used as the first conveyance unit and the other conveyance unit is used as a common unit for the first and second conveyance units.

Gas Mixing Prevention Device

A gas mixing prevention device 103 is disposed in the connection section 108 which spatially connects the formation unit 102 and the growth unit 104 to each other, and is composed of a set of devices for implementing the function to prevent the gas of the furnace internal space of the formation unit 102 and the gas of the furnace internal space of the growth unit 104 from mixing with each other. The gas mixing prevention device 103 may be implemented by, without limitation, a gate valve device or a rotary valve device capable of mechanically shutting off the spatial connection between the units during time durations other than during transfer of the substrate from one unit to another, a gas curtain device composed of a feeding device configured to be capable of injecting the purge gas, and an vent device for discharging the gases present inside the connection section 108, inside the formation unit 102 near the connection section 108, and inside the growth unit 104 near the connection section 108, out of the system. In particular, the gas mixing prevention device 103 preferably has an vent device 103a for suctioning at least one of the reducing gas flowing from the formation unit 102 side and the source gas flowing from the growth unit 104 side, and discharging the gases out of the CNT assembly manufacturing apparatus 100. Further, it is preferable that the gas mixing prevention device 103 has a purge gas ejection device 103b for injecting the purge gas along the opening surface of the connection portion 108 in addition to the vent device 103a, and the vent device 103a suctions the purge gas and exhausts it out of the manufacturing apparatus. According to the CNT assembly manufacturing apparatus 100 having such a configuration, reduction of the catalyst in the formation step becomes less likely to be inhibited, and the quality of the CNT assemblies obtained and the production efficiency of the CNT assemblies can be further improved. Further, the screw conveyor serving as the conveyance unit 107 rectifies the flows of the gases in the furnace internal spaces so as to flow along the screw vanes 107a, thereby suppressing diffusion of the gases due to suction and/or injection by the gas mixing prevention device 103, and further improving the gas mixing prevention effect. Note that the above devices may be used in combination with a gate valve device and/or a rotary valve device.

Cooling Unit

The cooling unit 106 is composed of a set of devices required to cool the substrate on which CNT assemblies have grown. The cooling unit 106 has the function of preventing oxidation of and provide cooling of the CNT assemblies, the catalyst, and the substrate after the growth step in the growth unit 104. The cooling unit 106 illustrated in FIG. 1 includes a cooling vessel 106a for retaining an inert gas, and a water-cooled cooling device 106b disposed so as to surround the internal space of the cooling vessel 106a. The illustrated aspect is not limitative. In the case where the cooling unit is air-cooled, the cooling unit may include an injection unit or the like for injecting an inert gas into the internal space of the cooling vessel. In the illustrated aspect, the cooling vessel 106a is connected to the growth furnace 104a via a connection section 110.

Connection Section

As described above, the front chamber 113, the formation furnace 102a, the growth furnace 104a, and the cooling vessel 106a are spatially connected to each other by the corresponding connection sections 108 to 110. In other words, each of the connection sections 108 to 110 is set of devices for spatially connecting the furnace internal space of each unit and serving to prevent the substrate 111 from being exposed to outside air when the substrate 111 is transferred from one unit to another. Examples of the connection sections 108 to 110 include a furnace or chamber capable of shielding the environment around the substrate from outside air and of allowing the substrate 111 to be passed from one unit to another. For example, the material of connections 108 to 110 may be Inconel® 601 (Inconel is a registered trademark in Japan, other countries, or both).

Outlet Purge Device

An outlet purge device 105 is composed of set of devices for preventing external air from entering from the substrate outlet into the apparatus furnace. The outlet purge device 105 has the function of changing the environment around the substrate 111 to become a purge gas environment. Specifically, the outlet purge device 105 may be implemented by a furnace or chamber for retaining the purge gas environment, an injector for injecting the purge gas, and the like. The purge gas is preferably an inert gas, and nitrogen is particularly preferred in terms of safety, cost, purging properties, and the like. When the substrate outlet is constantly open, a gas curtain device for injecting the purge gas in the form of shower from above and below is preferably provided as a purge gas injection section, so that the external air is prevented from entering from the outlet of the apparatus.

Ejecting Device for Reducing Gas, Source Gas, and Catalyst Activating Material A plurality of ejection holes functioning as the reducing gas ejection device 102b, the source gas ejection device 104b, and the catalyst activating material ejection device may be provided. For example, a plurality of pins may be provided from the wall surface of the formation furnace and/or the growth furnace toward the screw center, and a plurality of ejection holes may be provided in the side and/or the tip of each pin. In that case, for preventing interference with each pin, a notch is provided on the screw vane. Alternatively, for example, a gas flow path may be formed in the screw axis center portion of the screw conveyor, and a plurality of ejection holes may be provided between each vane pitch across the screw axis direction; or a plurality of gas nozzles may be provided so as to extend from the screw center toward each furnace wall (a plurality of ejection holes are provided in the side and/or the tip).

Provision of the plurality of ejection holes functioning as the reducing gas ejection device 102b as described above enables uniform dispersion of the reducing gas onto the substrate, which leads to efficient reduction of the catalyst. As a result, uniformity of CNT assemblies grown on the substrate can be improved and the amount of the reducing gas that is consumed can be reduced.

Provision of the plurality of ejection holes functioning as the source gas ejection device 104b as described above enables uniform dispersion of the source gas onto the substrate and efficient consumption of the source gas. As a result, uniformity of CNT assemblies grown on the substrate can be improved and the amount of the source gas that is consumed can be reduced.

Provision of the plurality of ejection holes functioning as the ejection device of the catalyst activating material as described above enables uniform dispersion of the catalyst activating material onto the substrate, improvement in the catalytic activity, and extension of the catalyst life. As a result, growth of aligned CNTs can be performed continuously for a long time. The similar configuration can be used in the case where the catalyst activating material is added to the source gas and a shower head is used as the ejection device.

Materials for Apparatus Components Exposed to Reducing Gas or Source Gas

The apparatus components exposed to the reducing gas or the source gas include a portion of the formation unit 102, the growth unit 104, the conveyance unit 107, the gas mixing prevention devices 103, and the connection sections 108 to 110. The material for forming these members may be a material that can withstand high temperatures, such as quartz, heat-resistant ceramics, heat-resistant alloys, and the like, for example. In terms of processing precision, degree of freedom of processing, cost, and the like, heat-resistant alloys are preferable. Examples of heat-resistant alloys include heat-resistant steel, stainless steel, and nickel-based alloys. In general, heat-resistant steel refers to steel that contains Fe as the principal component and other alloys in concentrations of 50% or less. Stainless steel generally refers to steel that contains Fe as the principal component and other alloys in concentrations of 50% or less, and contains approximately 12% or more of Cr. Furthermore, examples of nickel-based alloys include alloys obtained by adding Mo, Cr, Fe, and the like to Ni. Specifically, SUS 310, Inconel 600, Inconel 601, Inconel 625, Incoloy 800, MC Alloy, Haynes 230 Alloy, and the like are preferable in terms of heat resistance, mechanical strength, chemical stability, low cost, and other such considerations.

When forming the furnace inner wall and/or components used in the furnace from a metal, the material is preferably a heat-resistant alloy, and the surface is preferably plated with molten aluminum or polished so that the surface has an arithmetic average roughness Ra≤2 μm.

Figure 3:
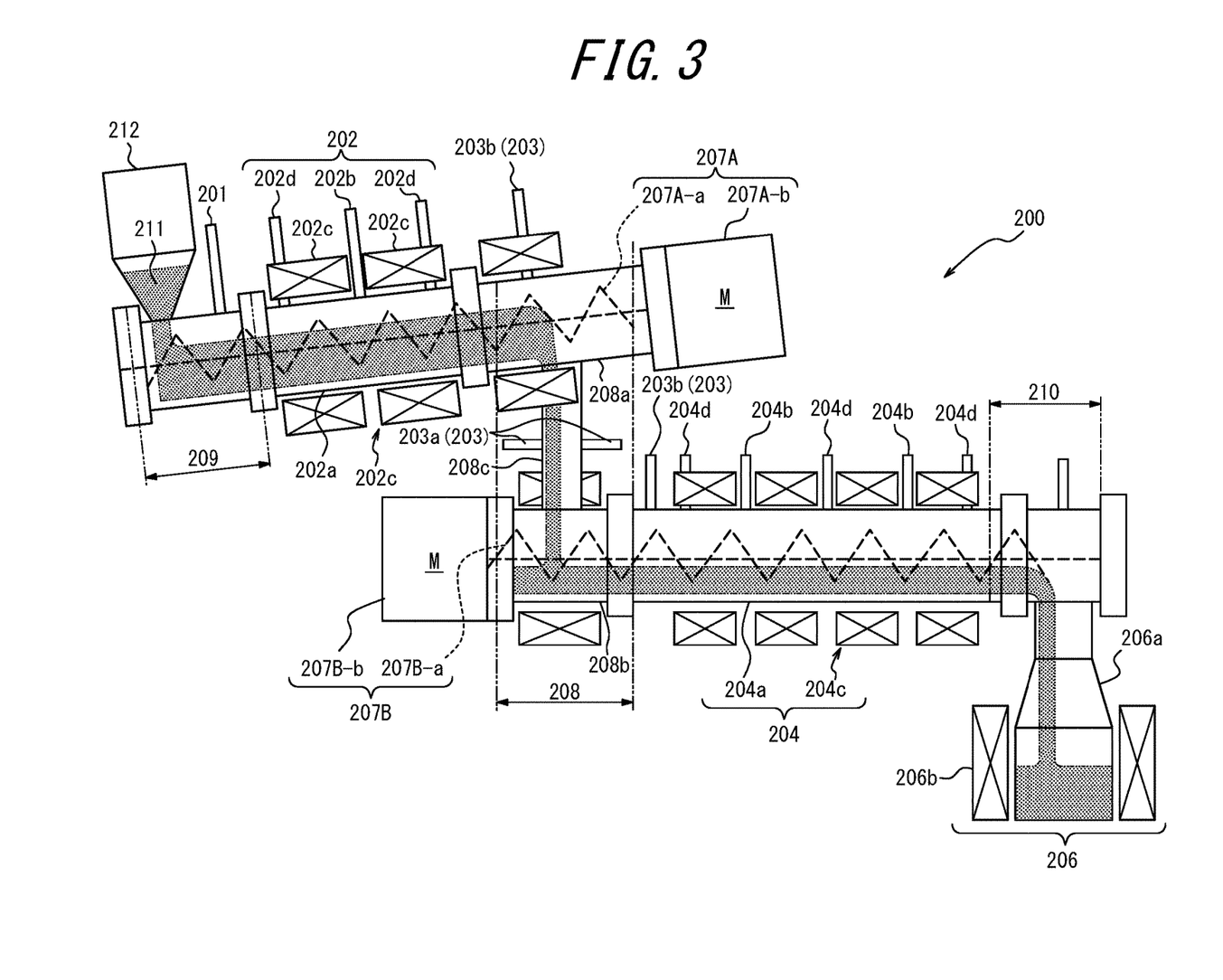
FIG. 3 is a diagram for explaining a schematic configuration of an apparatus capable of carrying out a CNT assembly production method according to another example of the present disclosure.

FIG. 3 is a diagram for explaining a schematic configuration of an apparatus capable of carrying out a CNT assembly production method according to another example of the present disclosure. Specifically, FIG. 3 illustrates an aspect in which the formation unit 202 and the growth unit 204 are separate components and are connected in series by a connection section 208. In FIG. 3, values obtained by adding 100 to reference symbols illustrated in FIG. 1 are given as reference symbols of corresponding components having the same or similar functions in FIG. 1. Description on the components having the same functions is omitted, and components that are different in terms of arrangement and the like will be described in the following.

Connection Section

The aspect illustrated in FIG. 3 differs significantly from the aspect illustrated in FIG. 1 in terms of the layout of the connection section 208. Specifically, the connection section 208 connects the formation unit 202 and the growth unit 204 in series, which are disposed as separate components vertically spaced apart from each other. The connection section 208 includes a first connection tube 208a connected to the formation furnace 202a on the rear stage side thereof, a second connection tube 208b connected to the growth furnace 204a on the front stage side thereof, and a connection tube 208c connecting these tubes in the vertical direction. These tubes are preferably provided with a heating device for heating the substrate 211 inside the tubes. As illustrated in FIG. 3, the first connection tube 208a includes a purge gas ejection device 203b, and the connection tube 208c includes an vent device 203a. Further, a purge gas ejection device 203b is provided in the vicinity of the inlet of the growth furnace 204a. These components collectively constitute the gas mixing prevention device 203.

Figure 4:
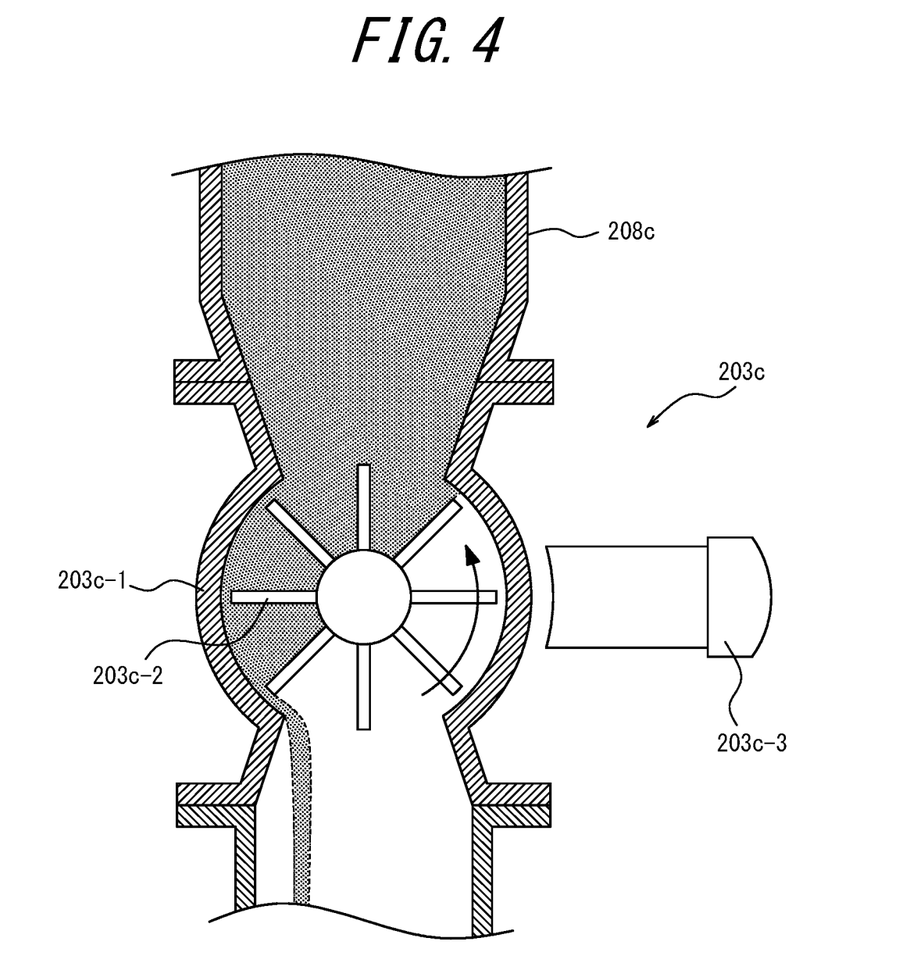
FIG. 4 is a diagram for explaining a schematic configuration of one example of a component of a gas mixing prevention device that can be provided in the apparatus described in FIG. 3.

Here, as illustrated in FIG. 4, the connection tube 208c may include a rotary valve device 203c. The rotary valve device 203c includes a rotary valve casing 203c-1, a rotary valve 203c-2, and a rotary valve driving device 203c-3 for driving the rotary valve 203c-2. Transfer of the substrate 211 is controlled by rotations of the rotary valve 203c-2. A combination of this control with control on currents by the vent device 203a and the purge gas ejection device 203b can contribute to further suitable separation of the atmosphere in the formation step and the atmosphere in the growth step. As a result, the quality of CNT assemblies obtained and the manufacturing efficiency of the CNT assemblies can be increased.

Conveyance Unit

Additionally, the aspect illustrated in FIG. 3 differs from the aspect illustrated in FIG. 1 in that the conveyance unit is implemented as two separate conveyance units. More specifically, the CNT assembly manufacturing apparatus 200 includes a first conveyance unit 207A that conveys the substrate 211 by screw rotations in the furnace internal space of the formation unit 202, and a second conveyance unit 207B that conveys the substrate 211 by screw rotations in the furnace internal space of the growth unit 204. The first conveyance unit 207A includes a first screw vane 207A-a and a first driving device 207A-b. The second conveyance unit 207B includes a second screw vane 207B-a and a second driving device 207B-b. As illustrated in FIG. 3, the first conveyance unit 207A and the second conveyance unit 207B may not be disposed in parallel to each other, and may be disposed at an angle. The angle may be, for example, 10° or less.

Here, in the aspect illustrated in FIG. 3, the first driving device 207A-b is arranged on the rear stage side of the formation unit 202, and the second driving device 207B-b is arranged on the front stage side of the growing unit 204. The aspect of this layout allows for a design in which the ends of the formation unit 202 and the growth unit 204 where the drive 207A-b and 207B-b are not disposed, respectively, are movably held whereas the coupling section between the formation unit 202 and the growth unit 204 is fixed. As a result, even when the sizes of components subjected to heat, such as the formation furnace 202a and the growth furnace 204a, vary due to thermal expansions, the ends of these components still remain movable, so that load on the apparatus caused by heat can be reduced.

In addition, as in the aspect illustrated in FIG. 3, the layout of vertically connecting the formation unit 202 and the growth unit 204, which are independent components separated from each other, by the connection section 208 in series, the conditions of the formation unit 202 and the growth unit 204 can be easily optimized independently. This can further increase the quality of CNT assemblies obtained and the manufacturing efficiency of the CNT assemblies.

EXAMPLES

The present disclosure will now be described below based on examples. However, present disclosure is not limited to the examples disclosed herein.

Example 1

CNT assemblies were produced using a CNT assembly manufacturing apparatus satisfying the schematic configuration described with reference to FIG. 1.

Catalyst Layer Formation Step

Zirconia (zirconium dioxide) beads ($ZrO_2$, volume average particle size D50:650 μm) as a substrate were charged into a rotary drum type coating apparatus. While the zirconia beads were agitated (20 rpm), a solution containing aluminum was sprayed (spray amount: 3 g/min, spray time: 940 seconds, spray air pressure: 10 MPa) by a spray gun. At the same time, compressed air (300 L/minute) was fed to the rotary drum for drying to form an aluminum-containing film on the zirconia beads. Next, a firing treatment was performed at 480° C. for 45 minutes to prepare primary catalyst particles having an aluminum oxide layer formed thereon. Thereafter, the resultant primary catalyst particles were charged into another rotary drum type coating apparatus. While agitating (at 20 rpm), compressed air (300 L/minute) was fed into the rotary drum. An iron catalyst solution was sprayed with a spray gun (spray amount: 2 g/min, spray time: 480 seconds, spray air pressure: 5 MPa) to form a coating film containing iron on the primary catalyst particles. Next, a firing treatment was performed at 220° C. for 20 minutes to prepare a substrate having an iron oxide layer further formed thereon.

The substrate having the catalyst on the surface thereof produced as described above was charged into a feeder hopper of the manufacturing apparatus, and the substrate was processed in the order of the formation step, the growth step, and the cooling step while the substrate was conveyed by a screw conveyor to produce CNT assemblies.

Formation Step to Cooling Step

Each condition of the inlet purge device, the formation unit, the gas mixing prevention device, the growth unit, the outlet purge device, and cooling unit of the CNT assembly manufacturing apparatus was set as follows.

Feeder Hopper

Feed rate: 1.25 kg/h
Exhaust volume: 10 sLm (spontaneous exhaust from the opening)

Inlet Purge Device

Purge gas: 40 sLm of nitrogen

Formation Unit

Temperature in furnace: 800° C.
Reducing gases: 6 sLm of nitrogen and 54 sLm of hydrogen
Exhaust volume: 60 sLm
Process time: 20 minutes Gas Mixing Prevention Device Purge gas: 20 sLm
Exhaust volume of vent device: 62 sLm Growth Unit Temperature in furnace: 830° C.
Source gases: 15 sLm of nitrogen, 5 sLm of ethylene, 1 sLm of carbon dioxide, and 3 sLm of hydrogen
Exhaust volume: 47 sLm
Process time: 10 minutes Outlet Purge Device Purge gas: 45 sLm of nitrogen Cooling Unit Cooling temperature: room temperature
Exhaust volume: 10 sLm (spontaneous exhaust from the opening)
Continuous production was carried out under the above conditions.

Separation and Recovery Step

The CNT assembly synthesized on the substrate was separated and recovered using a forced vortex classifier (revolution speed: 2300 rpm, air flow rate: 3.5 $Nm^3$/minute). The recovery rate of the CNT assembly was 96%.

The properties of the CNT assemblies produced in this example as typical values were as follows: tap bulk density: 0.02 g/cm$^3$, average length of CNTs: 150 μm, BET-specific surface area: 900 m$^2$/g, average outer diameter: 4.0 nm, and carbon purity: 99%. The results are summarized in Table 1.

TABLE 1

| Sampling No. | 1 | 100 |
|---|---|---|
| Yield (mg/g-beads) | 3.0 | 3.1 |
| G/D ratio | 2.0 | 2.1 |
| Average length of CNTs (μm) | 168 | 156 |
| BET-specific surface area (m$^2$/g) | 970 | 950 |

The sampling interval was 1 hour. Phenomena of decrease in the production amount and decrease in the quality of the CNT assemblies were not observed in a comparison between the 1$^{st}$ sampling and the 100$^{th}$ sampling.

As described above, according to the CNT assembly apparatus of the present disclosure, long CNT assemblies having high specific surface areas were continuously produced with high efficiency without decrease in the production amount and decrease in the quality during the continuous production.

Example 2

CNT assemblies were produced using a CNT assembly manufacturing apparatus satisfying the schematic configuration described with reference to FIG. 3.

Formation Step to Cooling Step

A substrate having a catalyst on the surface thereof, which was produced in the same manner as in Example 1, was charged into a feeder hopper of the CNT assembly manufacturing apparatus, and the substrate was processed in the order of the formation step, the growth step, and the cooling step while the substrate was conveyed by a screw conveyor to produce CNT assemblies.

Each condition of the inlet purge device, the formation unit, the gas mixing prevention device, the growth unit, the outlet purge device, and cooling unit of the CNT assembly manufacturing apparatus was set as follows.

Feeder Hopper

Feed rate: 2.5 kg/h
Exhaust volume: 10 sLm (spontaneous exhaust from the opening)

Inlet Purge Device

Purge gas: 40 sLm of nitrogen

Formation Unit

Temperature in furnace: 800° C.
Reducing gases: 6 sLm of nitrogen and 54 sLm of hydrogen
Total exhaust volume: 90 sLm
Process time: 60 minutes Gas Mixing Prevention Device Purge gas: 40 sLm
Exhaust volume of vent device: 40 sLm Growth Unit Temperature in furnace: 830° C.
Source gases: 30 sLm of nitrogen, 10 sLm of ethylene, 2 sLm of carbon dioxide, and 6 sLm of hydrogen
Total exhaust volume: 83 sLm
Process time: 10 minutes Outlet Purge Device Purge gas: 45 sLm of nitrogen Cooling Unit Cooling temperature: room temperature
Exhaust volume: 10 sLm (spontaneous exhaust from the opening)
Continuous production was carried out under the above conditions.

Separation and Recovery Step

The CNT assembly synthesized on the substrate was separated and recovered using a forced vortex classifier (revolution speed: 2300 rpm, air flow rate: 3.5 Nm$^3$/minute). The recovery rate of the CNT assembly was 96%.

The properties of the obtained CNT assemblies were the same as those of Example 1, and phenomena of decrease in the production amount and decrease in the quality of the CNT assembly were not observed in the continuous production.

As described above, according to the apparatus of the present disclosure, long CNT assemblies having high specific surface areas were continuously produced with high efficiency without decrease in the production amount and decrease in the quality during the continuous production.

Example 3

Recycling Step

Of the substrate used for the CNT assembly production in Example 1, 3 kg of the used substrate was collected, and an oxidation treatment (atmosphere: air, temperature: 800° C., process time: 30 minutes) was performed in a rotary kiln furnace to perform the recycling step for removing carbon adhered to the surface of the substrate. Using the substrate subjected to the recycling step, each process was performed in the same manner as in Example 1 to produce CNT assemblies.

The properties of the resultant CNT assemblies were almost similar to those of Example 1, except that the yield was reduced to 2.5 mg/g beads, which was about 80%.

It can be observed from Example 3 that long CNT assemblies having high specific surface areas were produced by using the recycled substrate in the production method of the present disclosure.

Verification example

Using catalyst substrate particles and a manufacturing apparatus similar to those used in Example 1, production of CNT assemblies was attempted under the same conditions as in Example 1 except that the conditions of the formation unit, the gas mixing prevention apparatus, and the growth unit were changed as follows.

Formation Unit

Temperature in furnace: 800° C.
Reducing gases: 6 sLm of nitrogen and 54 sLm of hydrogen
Exhaust volume: 70 sLm
Process time: 20 minutes Gas Mixing Prevention Device Purge gas: 0 sLm
Exhaust volume of vent device: 0 sLm Growth Unit Temperature in furnace: 830° C.
Source gases: 15 sLm of nitrogen, 5 sLm of ethylene, 1 sLm of carbon dioxide, and 3 sLm of hydrogen
Exhaust volume: 79 sLm
Process time: 10 minutes In this attempt, no growth of CNT assemblies was observed except for darkening of the surface of the catalyst substrate particles.

This example demonstrated in the production of the CNT assemblies that prevention of mixing of the source gas into the reducing gas is needed in the production of the CNT assemblies.

INDUSTRIAL APPLICABILITY

According to the present disclosure, high-quality CNT assemblies can be efficiently produced.

REFERENCE SIGNS LIST

| | |
|---|---|
| 100, 200 | CNT assembly manufacturing apparatus |
| 101, 201 | Inlet purge device |
| 102, 202 | Formation unit |
| 102a, 202a | Formation furnace |
| 102b, 202b | Reducing gas ejection device |
| 102c, 202c | Heating device |
| 102d, 202d | Vent device |
| 103, 203 | Gas mixing prevention device |
| 103a, 203a | Vent device |
| 103b, 203b | Purge gas ejection device |
| 104, 204 | Growth unit |
| 104a, 204a | Growth furnace |
| 104b, 204b | Source gas ejection device |
| 104c, 104c', 204c | Heating device |
| 104d, 204d | Vent device |
| 105, 205 | Outlet purge device |
| 106, 206 | Cooling unit |
| 106a, 206a | Cooling vessel |
| 106b, 206b | Water-cooled cooling device |
| 107, 207A, 207B | Conveyance unit |
| 107a, 207A-a, 207B-a | Screw vane |
| 107b, 207A-b, 207B-b | Driving device |
| 108-110, 208-210 | Connection section |
| 111, 211 | Substrate |
| 112, 212 | Hopper |
| 114 | Heating device |
| Ex1-Ex3 | Raw gas exhaust vent |
| G1, G2 | Source gas inlet |

The invention claimed is:

1. A method of producing a carbon nanotube assembly, the method is implemented for growing a carbon nanotube assembly having a specific surface area of 600 $m^2/g$ or more on a substrate having a catalyst on a surface thereof, the method comprising: carrying out formation of the catalyst including one or more of catalyst reduction, promotion of micronization of the catalyst, and improvement in a catalytic activity compared to that of the catalyst before carrying out formation and growing the carbon nanotube assembly, by using an apparatus comprising a formation unit that implements a formation step of causing an environment around the catalyst to become a reducing gas environment, and heating at least one of the catalyst and the reducing gas;

a growth unit that implements a growth step of growing the carbon nanotube assembly by causing the environment around the catalyst to become a source gas environment, and heating at least one of the catalyst and the source gas;

a connection section that spatially connects a furnace internal space of the formation unit and a furnace internal space of the growth unit to each other;

a first conveyance unit and a second conveyance unit, wherein the first conveyance unit conveys the substrate by screw rotations in the furnace internal space of the formation unit, the second conveyance unit conveys the substrate by screw rotations in the furnace internal space of the growth unit, the first conveyance unit and the second conveyance unit are configured as a single common unit or separate units; and a gas mixing prevention device which prevents the gas of the furnace internal space of the formation unit and the gas of the furnace internal space of the growth unit from mixing with each other, wherein the substrate is introduced into the apparatus via a hopper, the first conveyance unit includes a first driving device, the second conveyance unit includes a second driving device, the first driving device is arranged on a rear stage side of the formation unit, and the second driving device is arranged on a front stage side of the growth unit, the formation unit and the growth unit are separate components vertically spaced apart from each other and are connected in series by the connection section, and the formation step and the growth step while continuously conveying the substrate and preventing the gas environments in the respective steps from mixing with each other.

2. The method of producing a carbon nanotube assembly according to claim 1, wherein the gas mixing prevention device prevents the gas of the furnace internal space of the formation unit and the gas of the furnace internal space of the growth unit from mixing with each other by controlling a gas current.

3. The method of producing a carbon nanotube assembly according to claim 1, wherein at least one of the following is achieved:

in the formation step, the reducing gas is continuously fed so that the substrate being conveyed along a substrate conveying direction by the first conveyance unit and the reducing gas are brought into contact with each other in a state of an opposite current and a forward current, compared to the substrate conveying direction, in the furnace internal space of the formation unit; and in the growth step, the source gas is continuously fed so that the substrate being conveyed by the second conveyance unit and the source gas are brought into contact with each other in a state of an opposite current and a forward current, compared to the substrate conveying direction, in the furnace internal space of the growth unit.

4. The method of producing a carbon nanotube assembly according to claim 1, wherein the source gas environment in the growth step is an environment having a high carbon concentration, in which the source gas accounts for 0.1 volume % or more of the environment, and comprises a catalyst activating material.

5. The method of producing a carbon nanotube assembly according to claim 4, wherein the source gas environment comprises ethylene and carbon dioxide as the catalyst activating material.

6. The method of producing a carbon nanotube assembly according to claim 1, wherein the substrate is particles having an apparent density of 2.0 g/cm$^3$ or more.

7. The method of producing a carbon nanotube assembly according to claim 6, wherein the substrate comprises one or more elements of Al, Si, and Zr.

8. The method of producing a carbon nanotube assembly according to claim 1, comprising:
- a catalyst layer forming step of forming a catalyst layer on the substrate;
- a separation and recovery step of separating the carbon nanotube assembly from the substrate and recovering the substrate and the carbon nanotube assembly separately; and
- a recycling step of removing carbon on the recovered substrate to make the substrate reusable by oxidizing the recovered substrate.

* * * * *